US010574041B2

(12) United States Patent
Bier et al.

(10) Patent No.: US 10,574,041 B2
(45) Date of Patent: Feb. 25, 2020

(54) METHOD OF ESTABLISHING AN ELECTRICAL CONNECTION

(71) Applicants: Bruce Bier, Warren, NJ (US); Jeffrey L. Madden, Bernardsville, NJ (US)

(72) Inventors: Bruce Bier, Warren, NJ (US); Jeffrey L. Madden, Bernardsville, NJ (US)

(73) Assignee: Richards Manufacturing Company, LP, Irvington, NJ (US)

( * ) Notice: Subject to any disclaimer, the term of this patent is extended or adjusted under 35 U.S.C. 154(b) by 378 days.

(21) Appl. No.: 14/727,825

(22) Filed: Jun. 1, 2015

(65) Prior Publication Data

US 2015/0340850 A1 Nov. 26, 2015

Related U.S. Application Data

(63) Continuation of application No. 13/744,337, filed on Jan. 17, 2013, now Pat. No. 9,048,638.

(51) Int. Cl.

| | |
|---|---|
| ***H01R 43/00*** | (2006.01) |
| ***H02G 1/14*** | (2006.01) |
| ***H02G 5/00*** | (2006.01) |
| ***H02G 15/113*** | (2006.01) |
| *H02G 3/00* | (2006.01) |

(52) U.S. Cl.

CPC ................ *H02G 1/14* (2013.01); *H02G 5/00* (2013.01); *H02G 15/113* (2013.01); *H02G 3/263* (2013.01); *Y10T 29/49195* (2015.01); *Y10T 29/49197* (2015.01)

(58) Field of Classification Search

CPC .......... H02G 1/14; H02G 15/113; H02G 5/00; H02G 15/08; H02G 3/263; H01R 25/003; Y10T 29/49197; Y10T 29/49195; Y10T 29/49174; Y10T 29/49188

USPC ................ 29/857, 861, 869; 174/72 R, 88 S; 439/798

See application file for complete search history.

(56) References Cited

U.S. PATENT DOCUMENTS

| | | | | |
|---|---|---|---|---|
| 2,267,006 A * | 12/1941 | Xenis | H01R 25/003 174/88 S |
| 3,617,811 A | 11/1971 | McVoy | |
| 3,740,692 A * | 6/1973 | Filhaber | H02G 15/08 174/72 R |
| 4,778,948 A | 10/1988 | Fitch et al. | |
| 7,403,372 B2 * | 7/2008 | Reed | H01H 85/306 337/237 |
| 7,358,845 B2 | 12/2008 | Moffat | |
| 7,736,187 B2 | 6/2010 | Yaworski et al. | |
| 8,129,618 B2 | 3/2012 | Bier | |

* cited by examiner

*Primary Examiner* — Donghai D Nguyen
(74) *Attorney, Agent, or Firm* — Bakos & Kritzer

(57) ABSTRACT

An apparatus and method for interconnecting mains cables used for underground secondary low-voltage AC network systems utilizing an improved crab joint connector arranged to maximize the number of interconnections in a compact design wherein the plurality of legs are arranged in a rectangle configuration and a single bus leg is positioned at an end of an insulated housing.

2 Claims, 12 Drawing Sheets

216
214
208
206
200
204
200
212
202
210
210
211

METHOD OF ESTABLISHING AN ELECTRICAL CONNECTION

CROSS-REFERENCE TO RELATED APPLICATIONS

This application is a continuation of U.S. patent application Ser. No. 13/744,337, filed on Jan. 17, 2013, now U.S. Pat. No. 9,048,638, issued Jun. 2, 2015, and the foregoing application is herein incorporated by reference in its entirety.

FIELD OF THE INVENTION

The present invention relates to an apparatus for interconnecting mains cables used for underground secondary low-voltage AC network systems. More particularly, the invention relates to an improved crab joint connector arranged to maximize the number of interconnections in a compact design.

BACKGROUND OF THE INVENTION

Electrical distribution networks are critical for the delivery of electricity to consumers and businesses from the transmission system. Such a network can include power lines, substations, transformers, and meters that are interconnected by thousands of miles of cables. In densely populated urban areas, electricity is transmitted to consumers via secondary low-voltage AC network systems which are formed by feeding several transformers into a common bus. A secondary low-voltage AC network system is generally characterized as a system wherein customers are served from three-phase, four-wire low-voltage circuits supplied by two or more network transformers whose low-voltage terminals are connected to the low-voltage circuits through network protectors. The secondary network system has two or more high-voltage primary feeders, with each primary feeder typically supplying 1-30 network transformers, depending on network size and design. Such systems include automatic protective devices intended to isolate faulted primary feeders, network transformers, or low-voltage cable sections while maintaining service to the customers served from the low-voltage circuits. While secondary low-voltage AC network distribution connections as discussed herein are typically housed in an above-ground cabinet or a below-ground box, it is generally preferred that these secondary networks are located underground, due to the impracticability of using overhead wires in densely populated urban areas. As a result, the connections may be subjected to moisture and may even become submerged in water. If the cable conductors or conductor members of the bus bars are left exposed, water and environmental contaminants may cause short circuit failure and/or corrosion thereon. In addition, as an urban area grows, the process of connecting additional customers to the secondary network involves the costly procedure of excavating and splicing connections to the common bus. Such problems of expansion have not been entirely ignored by the industry.

It is believed that since about 1935, crab joints have been used for reducing the time associated with interconnecting mains cables used in underground secondary low-voltage AC network systems. A crab joint basically includes a central hub (often referred to as a "busbar") with multiple fusible connections (referred to as "limiters") to a number of cables constituting part of a network. The limiters act to protect the cables connected to the crab joint in case of a failure of any of the cables in the network. A typical crab joint consists of a plurality of cable connectors, also known as legs, electrically connected to a common junction plate. The connectors are arranged such that a plurality of legs surround a center leg as shown in FIG. 1A (PRIOR ART). The center member is connected to other electrical components, such as another crab joint, while the surrounding legs are connected to a continuation of the cables for "network mains" or feeding customers. More specifically, FIG. 1A depicts the typical arrangement wherein a center connector 100 is surrounded by a plurality of connectors 102. Connector 102 is typically a fusible connector, while connector 100 is non-fusible and connected to other accessories, such as another crab joint. The crab joint greatly reduces the labor associated with splicing cables and improves reliability because the linesperson simply connects a prepared cable to an available connector, instead of preparing multiple cables for splicing. This achieves the requirement to connect a number of cables to one geometric point (in electrical terms).

The conventional crab joint generally used in secondary low-voltage AC network systems comprises compression connectors with EPDM rubber seals to connect network cables to the busbar. In older prior art joints, the limiter elements could not be individually replaced and in early conventional crab joint design, a failed or blown limiter was not readily discernible from the exterior of the crab joint. Of course, such construction made it very difficult to visually detect an opened limiter in a crab joint. As a result, opened limiters often existed undetected for long durations resulting in low voltage in the serviced area or overloading of a network transformer. Repairs of such problems required excessive work by "troubleshooting crews" tasked with testing and inspecting substantial lengths of cable runs and related components without an easy solution for troubleshooting failure.

While there have been several improvements to the crab joint, such as material improvements, fault identifiers, and the like, the arrangement of the connectors has remained largely unchanged since the original development of crab joints over seventy years ago. One major development in the field of secondary voltage systems was the introduction of fusible connectors; however, crab joint configuration design still generally remained the same. Fusible connectors were designed in response to one or more mains in a crab joint experiencing excessive currents due to a short circuit. The short circuit fault caused the connector of a crab joint to overheat and eventually destroy itself. This destruction could subsequently damage the surrounding connectors and mains cables that may not have been experiencing the fault current. As a result, a short circuit fault could bring down power to all customers connected to the crab joint. A limiter, such as a fuse, is typically located between the mains connection and junction plate—where all the mains connectors are electrically connected together. The limiter is designed to disconnect the main experiencing the fault condition, just before the heat from the short circuit current damages the other mains connected to the crab joint.

One primary reason that crab joint design has not departed from the original design conceived over seventy years ago is that current crab joint designs simply work for the intended purpose. As referenced, even with the addition of the fusible connectors, crab joints have been modestly modified and maintained the same arrangement for the connectors. In fact, the addition of these limiters has reinforced the existence of the current design, as the minimum distance between connectors must be such that it impedes a blown limiter from damaging other connectors. Thus, rather than minimizing the distance between crab joint connectors, a current trend of crab joint designs focuses on improving fusible connectors to exist in the environment of existing crab joints. For example, Mofatt U.S. Pat. No. 7,358,845 entitled "Cable Limiter and Crab Limiter Employing Replaceable Fusible Element" is directed to the improved fusible connectors and references various other inventions relating to improving fuses which are designed to be compatible with crab joint systems. FIG. 1B depicts a crab joint known in the art which is integral to the operation of the improved design of fusible connectors of Mofatt. As shown, the connectors are arranged similar such that a center connector 104 is surrounded between a plurality of connectors 106. It is readily apparent in the Moffat disclosure that the crab joints known in the art are of the typical design disclosed in FIG. 1A wherein the ring bus leg is disposed in the center of the arrangement. In the Mofatt design, when a fusible connector fails, only the failed fuse needs to be replaced instead of the whole crab joint. While Mofatt teaches the inclusion of an annunciator on the fusible connector to indicate the status of the fusible element (wherein the annunciator can either be an auditory signal or wireless communication in order to facilitate personnel in finding and replacing blown fuses), the invention of Mofatt is designed to be compatible with the connectors in the traditional crab joint formation currently known in the art.

Even when inventions in the field of crab joints result in the adjustment of the configuration of crab joints, the change is minimal and is generally for purposes other than compactness. In one example of modified crab joint design (U.S. Pat. No. 8,129,618 entitled "Cable Joint," issued to Bier), the location of the center connector is offset. According to the patent, this modification was primarily to facilitate a U-shape which was designed to allow personnel to easily view and visually identify a blown fuse without having to move the location of connected components. This modified design is shown in FIG. 1C (PRIOR ART). Specifically FIG. 1C depicts a preferred embodiment of Bier, which teaches a seven way crab joint with an improved design including a visual indicator for determining whether or not a corresponding limiter is blown. Center connector 108 is positioned between a plurality of connectors 110, but is offset from a central position of the crab joint. As mentioned, the purpose of the change of the location of the center connector was to facilitate personnel easily looking down and identifying a blown fuse, rather than for the purpose of providing a compact design which eliminates material and space requirements when in use.

While FIG. 1C discloses the improved seven-way crab joint of Bier U.S. Pat. No. 8,129,618 entitled "Cable Joint," a simpler seven-way design is presented in FIG. 1D. Specifically, FIG. 1D illustrates an arrangement that adapts the arrangement in FIG. 1A, but for a seven way crab joint. Similar to the arrangement in FIG. 1A, a center connector 112 is surrounded by connectors 114.

It is well known in the art that space allocation in electrical component cabinets and underground systems is a primary concern, especially as more power is necessary to support residential and commercial areas in growing metropolitan cities. The facilities for the components of secondary low-voltage AC network systems is generally not expanding in proportion to the demand, and as a result, the components themselves need to change. Thus, there is an apparent need in the art for components of reduced size. However, merely altering the size of the components is not always an easy solution. In particular, crab joints must be designed of sufficient size, shape, and material so that the crab joint can handle the substantial voltage without significantly impeding current flow, can be easily repaired, can be compatible with existing systems, and most importantly can handle surges and potential damage from blown fuses. So while there exists an apparent need for a compact crab joint design, no known developments have resulted in an improved design that meets the objectives required to operate in the complex environment of secondary low-voltage AC network systems.

SUMMARY

Various embodiments of the present invention involve a compact crab joint connector. In the preferred embodiment, the crab joint connector is a seven-way crab joint connector. The crab joint of the present invention is directed to a multiple cable connection wherein the mains cables are, through the use of the crab joint, electrically interconnected and may be joined to auxiliary or service cables, and wherein each connection of a cable terminal through the joint is separably and independently protected by a limiter section. The primary object of the present invention is to allow for the plurality of cables to be electrically connected through the use of a single unitary element with at least some of the cable lengths protected within the unitary element by a limiter or fuse component in a substantially reduced space. In the event that a fault develops in one or more of the connected cables, the limiter or fuse component will blow and open the cable circuit thereby interrupting the flow of the electrical current before the faulted circuit is allowed to create substantial damage to the respective cable insulation. Of primary concern is that the crab joint is designed so that a single short in one of the cables does not cause substantial damage to the other connected cables. One of ordinary skill in the art will readily recognize that it is of utmost importance that the crab joint of the present invention is designed so that any fault in the cables connected to the unitary joint does not result in the interruption of the electrical continuity of the serviced facility for the crab joint.

The development of a compact crab joint is necessary in the art for a myriad of reasons. First, the compact crab joint of the present invention is designed to reduce the time necessary for installation or maintenance. This benefit over existing joints is the result of the compact design as less material is required to be excavated to install a new crab joint in an underground environment and less space is required in an aboveground installation. Furthermore, in pre-existing underground structures, a compact crab joint allows more crab joints to be installed before requiring the costly construction of an enlarged structure. While the space limitation is the primary benefit of the compact crab joint of the present invention (primarily as a result of the repositioning of the ring bus leg), the present invention also allows for improved operation and maintenance as the ring bus leg is better located in the rear of the joint allowing unobstructed access to limiter legs.

It is an object of the present invention to provide a crab joint capable for use in a secondary low-voltage AC network system. In one embodiment of the present invention, a crab joint is disclosed including an insulated housing with a plurality of integrally molded legs. In the present example, the crab joint has a plurality of legs extending from a first end of the housing and a plurality of legs extending from a second end of the housing. A pigtail (short cable length) is attached to each leg wherein the pigtail allows a linesperson to easily attach a cable-to-cable butt splice to the crab joint. The legs extending from the joint are electrically connected at a junction plate located in an intermediate section of the housing, and a limiter, known in the art, is positioned between the leg and the junction plate. At least one ring bus leg is included on each end of the housing for the purpose of connecting to another electrical apparatus, such as another crab joint. The ring bus leg is electrically connected to the junction plate, and a pigtail is also attached to the ring bus leg in order to improve the ease of installing a prepared cable to the crab joint.

BRIEF DESCRIPTION OF THE FIGURES

A further understanding of the present invention and the objectives other than those set forth above can be obtained by reference to the various implementations set forth in the illustrations of the accompanying figures. Although the illustrated implementations illustrate certain aspects of the present invention, the apparatus and method of use of the invention, in general, together with further objectives and advantages thereof, may be more easily understood by reference to the drawings, examples, and the following description. The examples and figures are not intended to limit the scope of this invention, which is set forth with particularity in the claims as appended or as subsequently amended, but merely to clarify and exemplify the invention. The detailed description makes reference to the accompanying figures wherein:

DETAILED DESCRIPTION OF THE PREFERRED EMBODIMENT

Figure 1A:
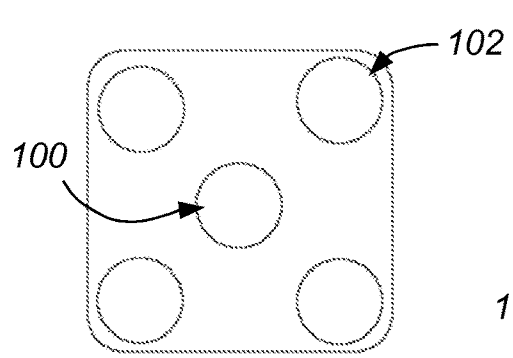
FIGS. 1A (PRIOR ART), 1B (PRIOR ART), 1C (PRIOR ART), and 1D (PRIOR ART) depict typical arrangements of crab joint connectors.

A detailed description of the various embodiments of the present invention is disclosed herein. However, techniques of manufacture and resulting structures in accordance with the present invention may be embodied in a wide variety of forms and modes, some of which may be quite different from those in the disclosed embodiments. Consequently, the specific structural details disclosed herein are merely representative, yet in that regard, they are deemed to represent suitable implementations for purposes of disclosure and to provide a basis for the claims herein, which define the scope of the present invention. Well known methods, procedures, and substances for both carrying out the objectives of the present invention and illustrating the preferred embodiment are incorporated herein but have not been described in detail as to not unnecessarily obscure novel aspects of the present invention.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, electronic or otherwise, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the Detailed Description of the Preferred Embodiment using the singular or plural number may also include the plural or singular number respectively. The word "or," in reference to a list of two or more items, covers all of the following interpretations of the word: any of the items in the list, all of the items in the list, and any combination of the items in the list.

In accordance with an exemplary embodiment of the present invention as shown in FIG. 2 through FIG. 5, a crab joint installation 214 is composed of a series of racked crab joints 200 placed in a vertical arrangement. The crab joint installation 214 is depicted in a common rack system 216 which is generally utilized in an underground installation. As depicted in the crab joint installation 214, three seven-way crab joints 200 are shown allowed for the installation of a total of six ring bus legs and eighteen standard legs. The insulated housing 202 is shown with a plurality of integrally molded legs 210. In the present example, crab joint 200 has six legs 210 extending from a first end 204 of housing 202 and six legs 210 extending from a second end 206 of housing 200. While a seven-way design is depicted (i.e., six legs and one ring bus leg), one of ordinary skill in the art will readily recognize that the same design structure could be employed for a three-way design by eliminating four outermost legs and a five-way design by eliminating two outermost legs. A pigtail 211 is attached to each leg 210. Pigtail 211 allows a linesperson to easily attach a cable-to-cable butt splice to crab joint 200. The legs 210 extending from end 206 and end 204 are electrically connected at a junction plate (not shown) located in intermediate section 208 of housing 200. A limiter, known in the art, is positioned between leg 210 and the junction plate. Each pigtail 211 is rated for a current that does not exceed the current rating of the limiter connecting leg 210 to the junction plate, during normal operation. Further, at least one bus leg 212 is included on each end of housing 202, for the purpose of connecting to another electrical apparatus, such as another crab joint. Ring bus leg 212 is electrically connected to the junction plate (not shown) located in intermediate section 208 of housing 202. A ring bus leg as used throughout this application is generally defined as a non-limitered (i.e., non-fused) connector having a cable to create an electrical reference point that is designed to balance the load on a particular joint. A pigtail 211 is also attached to ring bus leg 212 in order to improve the ease of installing a prepared cable to crab joint 200.

The junction plate (not shown), legs 202, and ring bus leg 212 can be made from a highly conductive material, such as pure copper, and plated with a material such as tin to resist corrosion.

In the present embodiment, insulated housing 202 consists of an inner high-temperature shell, which provides separate arcing chambers for each leg 210. Therefore, the arching chambers of insulated housing 210 confine the resultant electrical arcs and molten material incident from a blown limiter. Additionally, the outer surface of insulated housing 202 can be made of various insulating polymers, silicone, EPDM or other suitable materials known to those of ordinary skill in the art. The insulation surface of pigtails 211 can also be made of the same materials as that of insulated housing 202.

Figure 1B:
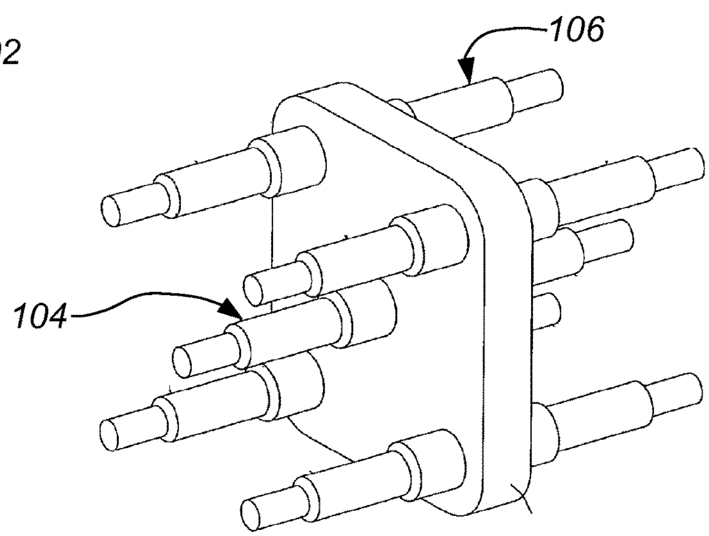
Figure 1C:
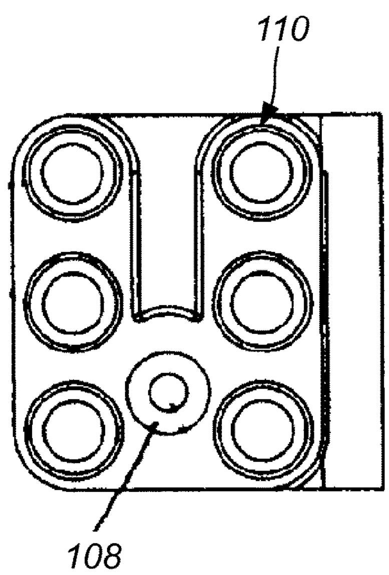
Figure 1D:
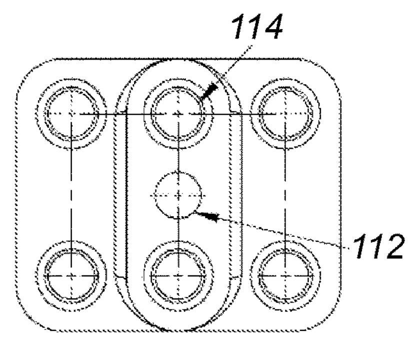
Figure 2:
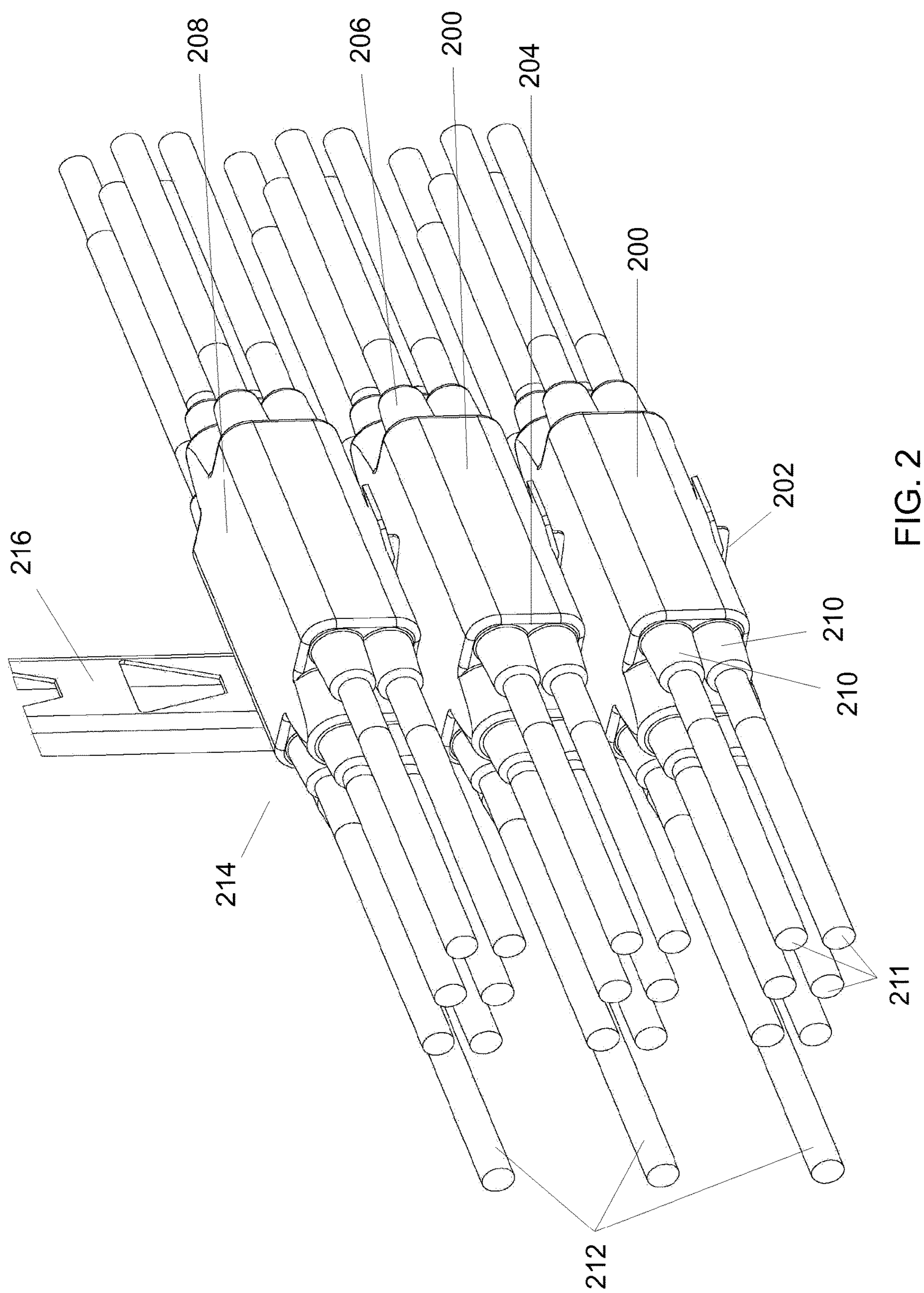
FIG. 2 is a perspective view of an exemplary seven-way crab joint of the present invention.
Figure 3:
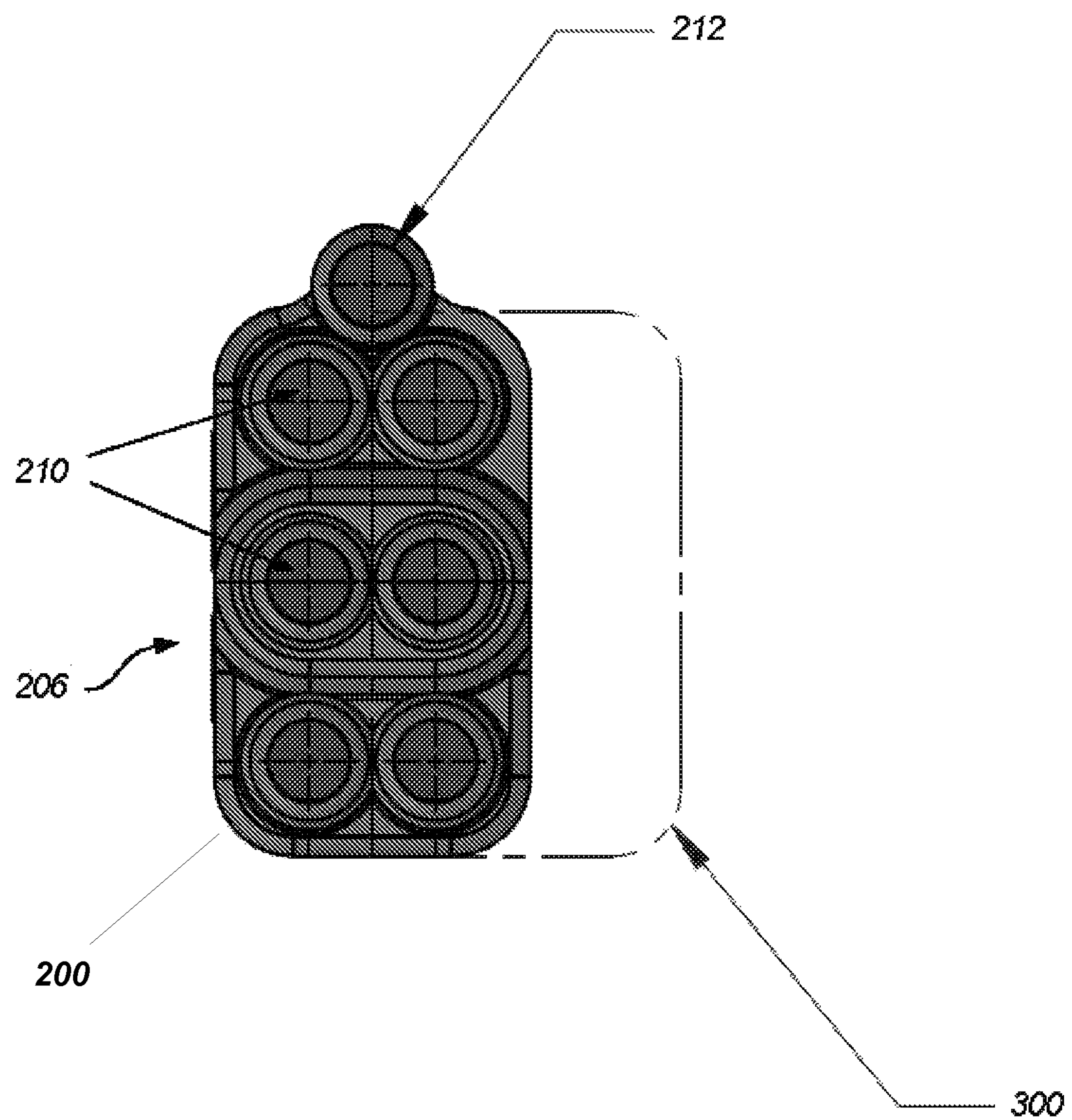
FIG. 3 is a perspective view of the preferred embodiment of the present invention depicting an exemplary seven-way crab joint.
Figure 4:
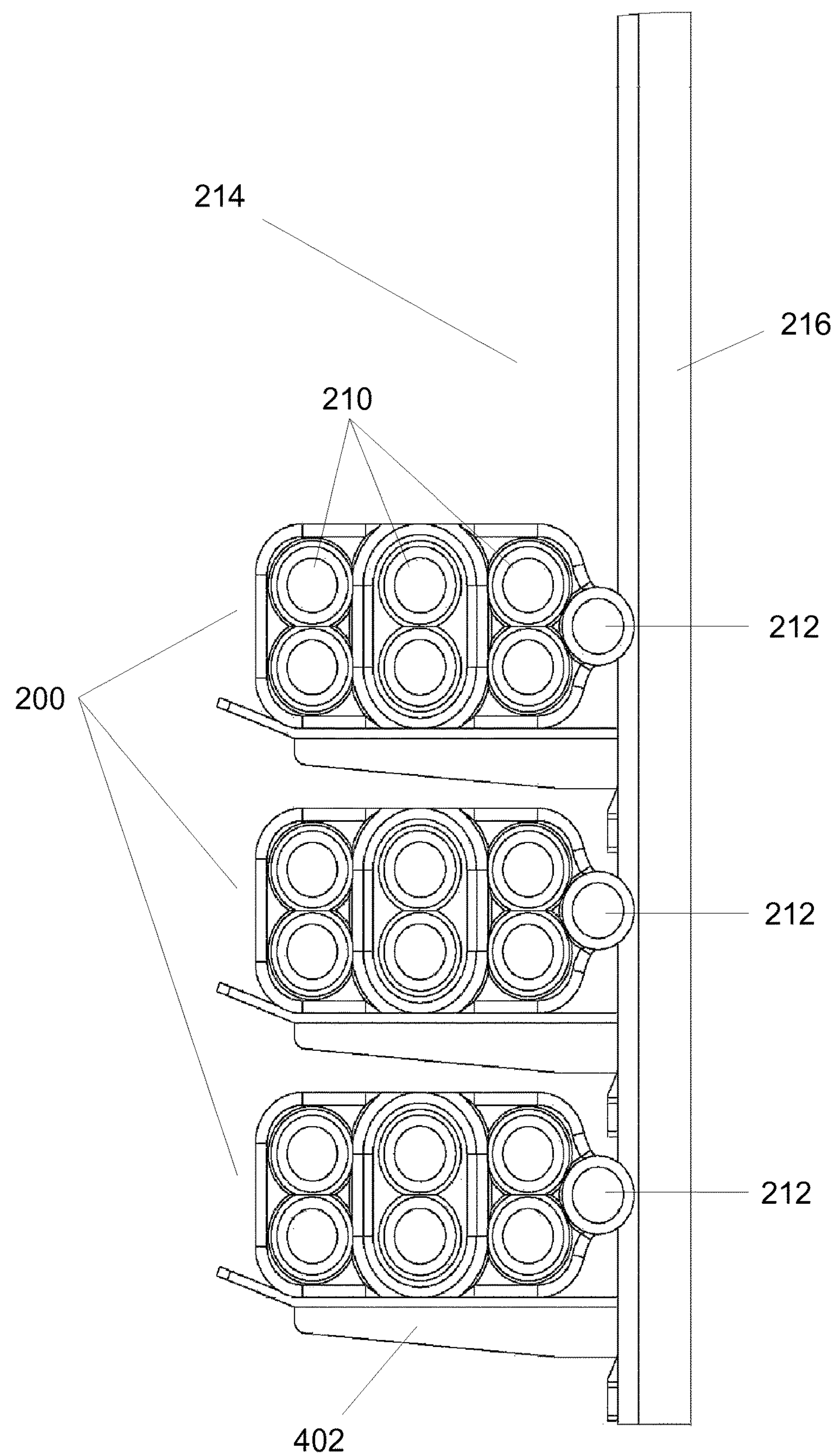
FIG. 4 is a side view of the crab joint installation of the preferred embodiment of an exemplary seven-way crab joint of FIG. 2, composed of a series of racked crab joints 200.

FIG. 3 is a perspective view of an end of the improved crab joint 200 the present invention. Compared to prior art crab joints referenced herein, such as the embodiment presented in FIG. 1B (PRIOR ART), the arrangement of the present invention reduces the space requirement of a crab joint as indicated by the dash lined 300. This is accomplished by changing the position of ring bus leg 212 from a central position to a position that optimizes vertical space. In the present invention, the plurality of legs 210 are arranged in a rectangular configuration. Ring bus leg 212 is positioned at a side of insulated housing 202, in this case, the side located nearest to the rack installation once racked. This positioning of the crab joints 200 is further shown in FIG. 4. Specifically, FIG. 4 shows a side view of the crab joint installation 214 of FIG. 2, composed of a series of racked crab joints 200. In the present figure, the ring bus leg 212 for each crab joint 200 is shown positioned between the common rack system 216 and the plurality of legs 210. Common rack system shelf 402 is also shown for supporting the crab joints 200 and maintaining the distance between each in a vertical plane.

Figure 5:
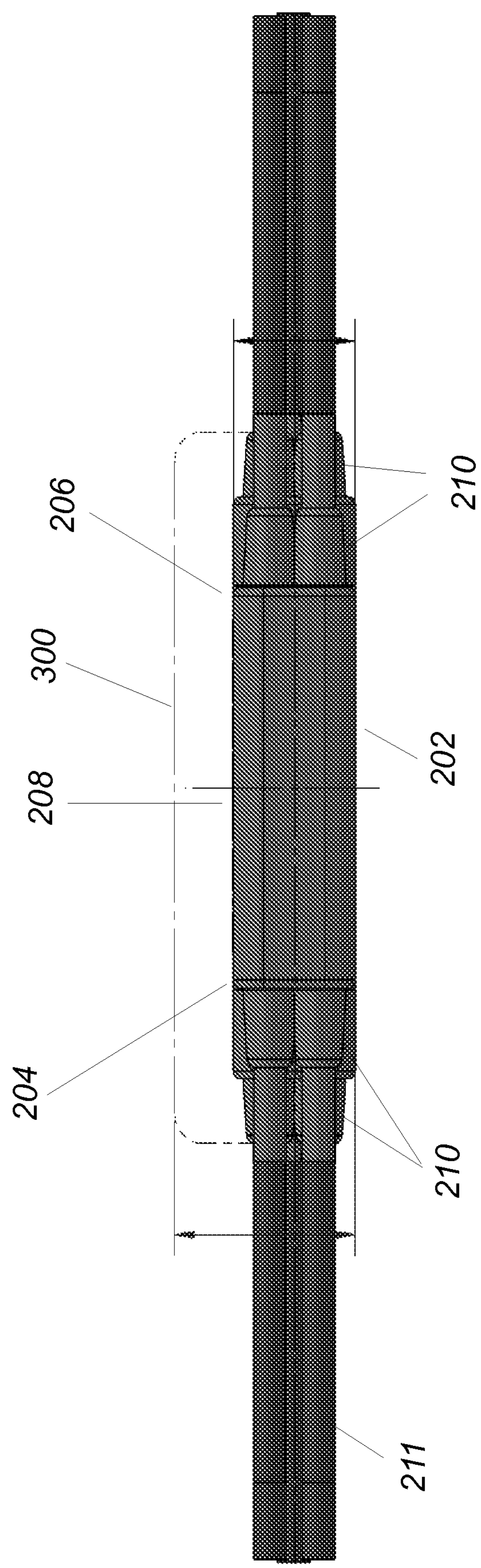
FIG. 5 is a side view of the preferred embodiment of the present invention depicting an exemplary seven-way crab joint.

Next, FIG. 5 is a side view of an exemplary seven-way crab joint of the present invention with assembled cable mains and a ring bus leg connected thereto. In the present embodiment the position of legs 210 are staggered. The insulated housing 202 is shown with a plurality of integrally molded legs 210. In this depiction, the crab joint has six legs 210 extending from a first end 204 of insulated housing 202 and six legs 210 extending from a second end 206 of housing 200. A pigtail 211 is attached to each leg 210. The legs 210 extending are electrically connected at a junction plate (not shown) located in intermediate section 208 of insulated housing 200. Again, the space-saving improvements are depicted by the dashed line 300.

Figure 6:
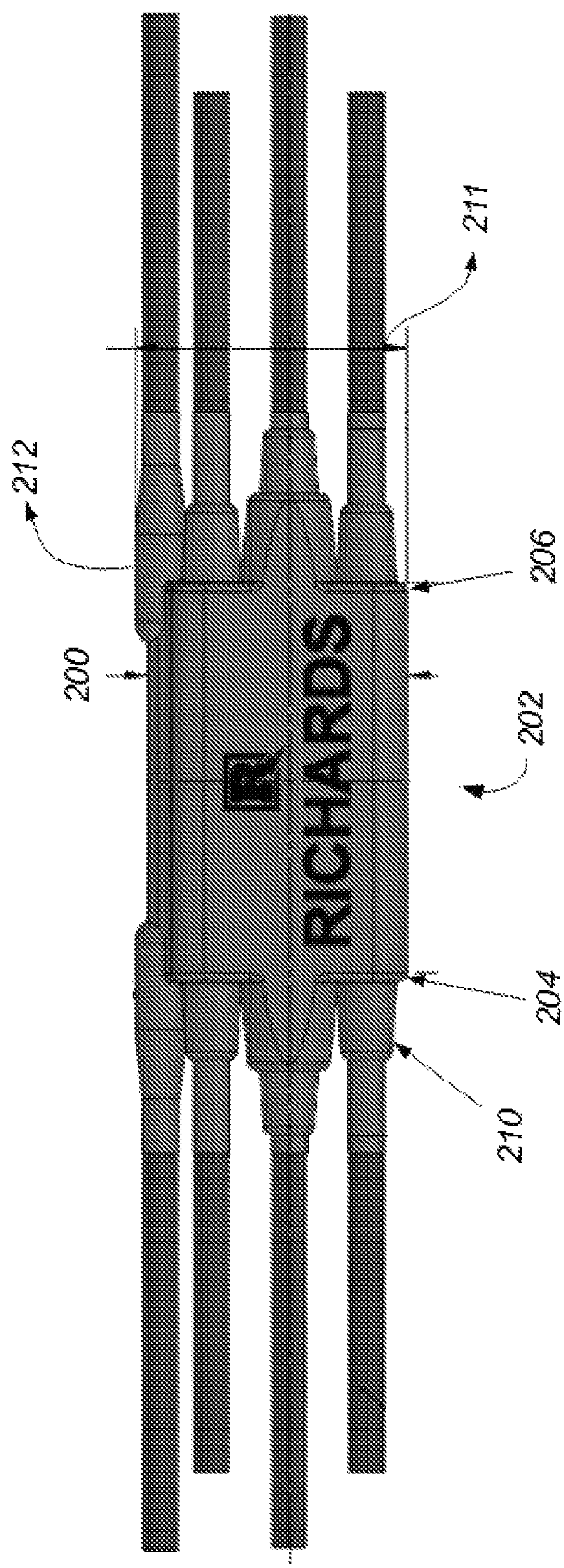
FIG. 6 is a top view of the preferred embodiment of the present invention depicting an exemplary seven-way crab joint.

FIG. 6 depicts a top view of an exemplary embodiment of the present invention, further exemplifying the staggered positioning of legs 210. Again, the insulated housing 202 is shown with a plurality of integrally molded legs 210. In this depiction, crab joint 200 has six legs 210 extending from a first end 204 of insulated housing 202 and six legs 210 extending from a second end 206 of housing 200. A pigtail 211 is attached to each leg 210. The legs 210 extending are electrically connected at a junction plate (not shown) located in intermediate section 208 of housing 200. Ring bus leg 212 is positioned at the side of crab joint 200 which is designed to be positioned closest to a rack structure (not shown) in a mounted assembly.

Figure 7:
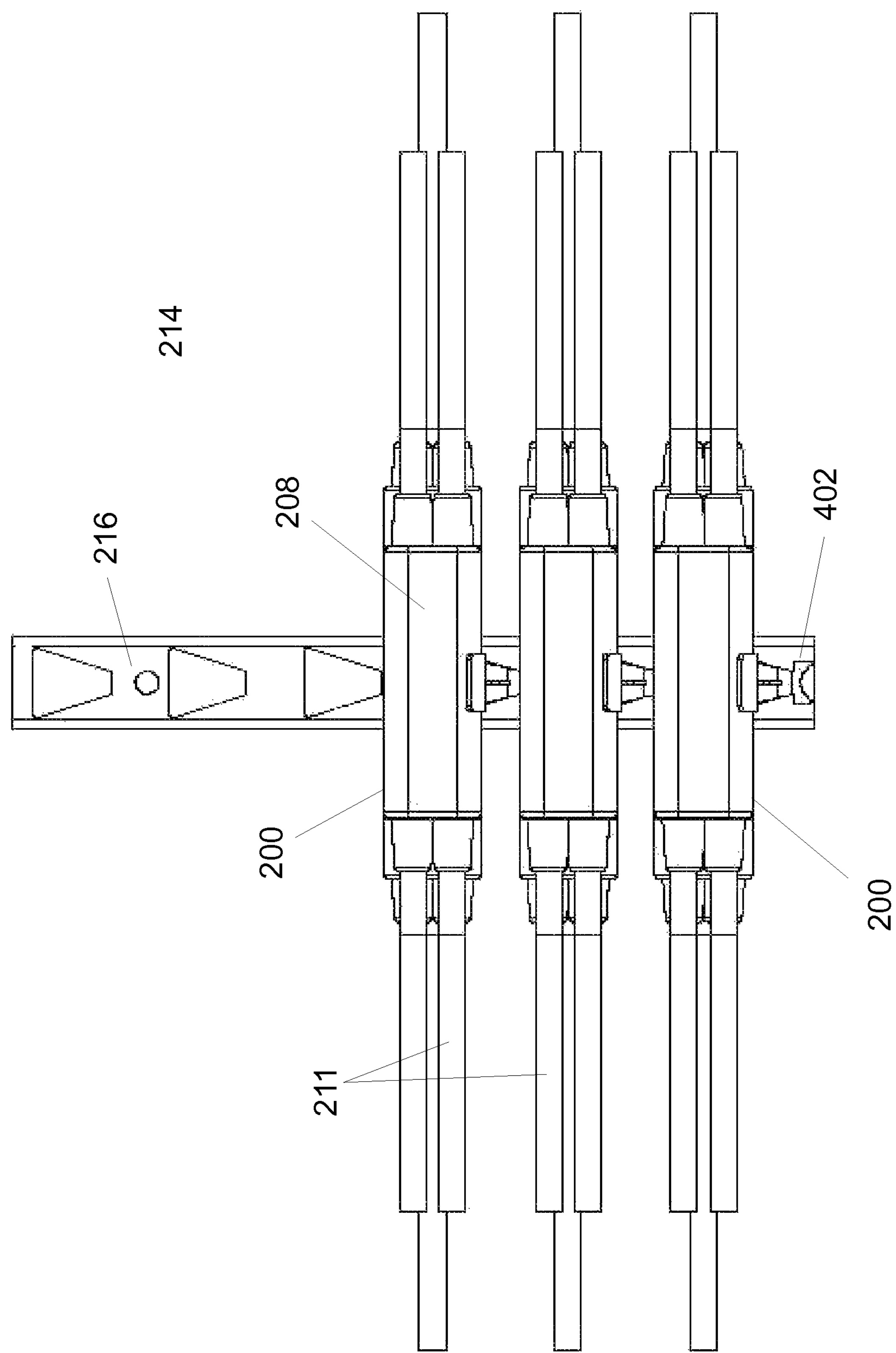
FIG. 7 is a front view of the crab joint installation of the preferred embodiment of the present invention depicting an exemplary seven-way crab joint in a vertical racked environment, comprising a series of racked crab joints as generally depicted in FIG. 2.

Turning next to FIG. 7, depicted is a front view of the a crab joint installation 214, composed of a series of racked crab joints 200 placed in a vertical arrangement as generally depicted in FIG. 2. The crab joint installation 214 is depicted in a common rack system 216 which is generally utilized in an underground installation. The intermediate section 208 of the crab joint 200 rests on and can be secured to shelf 402 of the common rack system. Shelf 402 can be positioned to accommodate the reduced size of crab joint 200. Three seven-way crab joints 200 are shown allowing for the installation of a plurality of ring bus legs and standard legs. Pigtails 211 are further shown attached to the various legs. Due to the compact configuration of crab joints 200, rack space is optimized in the vertical direction allowing for the inclusion of multiple additional crab joints in a space reserved for far fewer prior art crab joints.

Figure 8A:
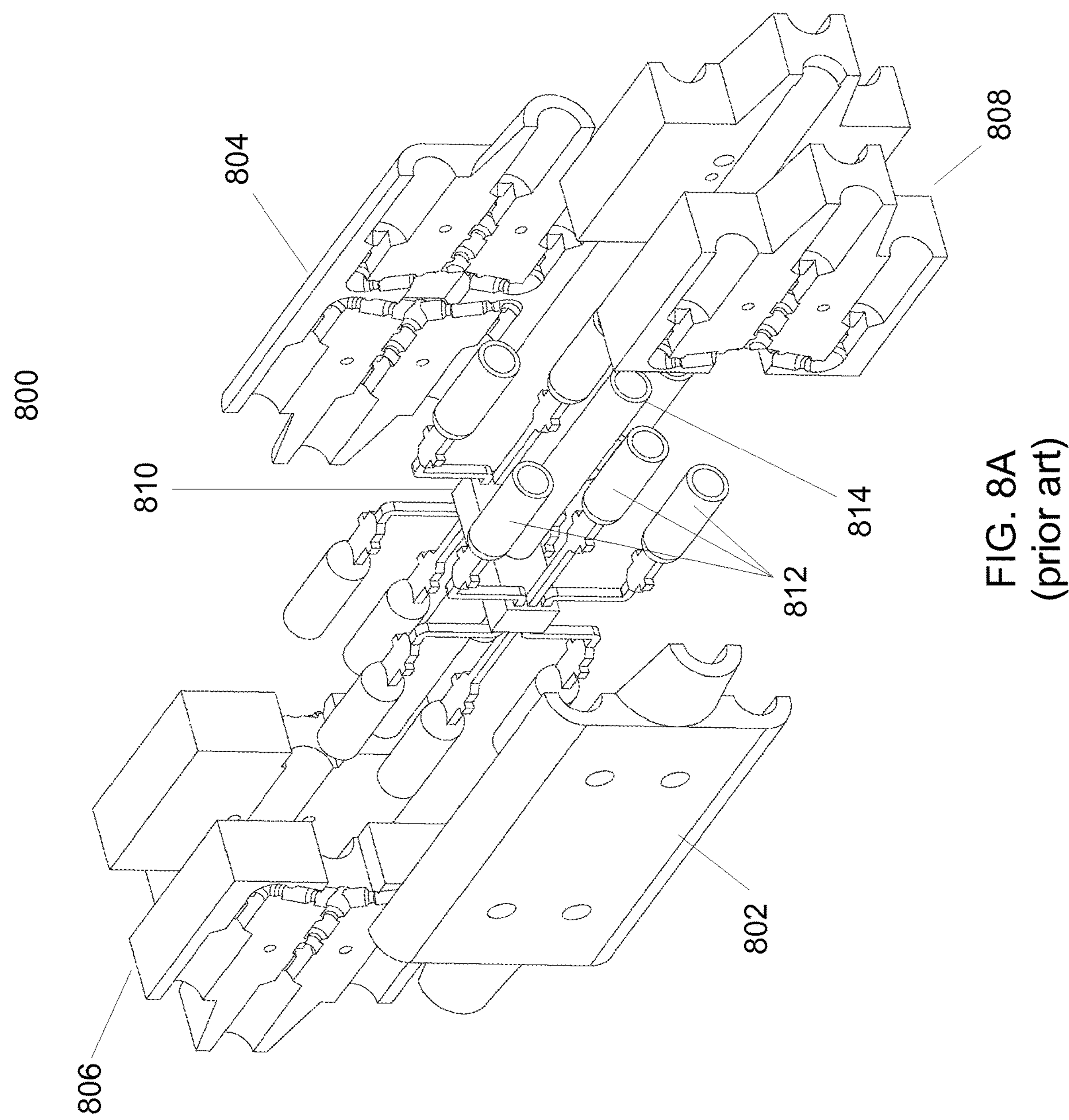
FIG. 8A and FIG. 8B are cut-away views of the various components utilized to construct an existing crab joint (FIG. 8A) and the low-profile crab joint (FIG. 8B) claimed in the present invention.
Figure 8B:
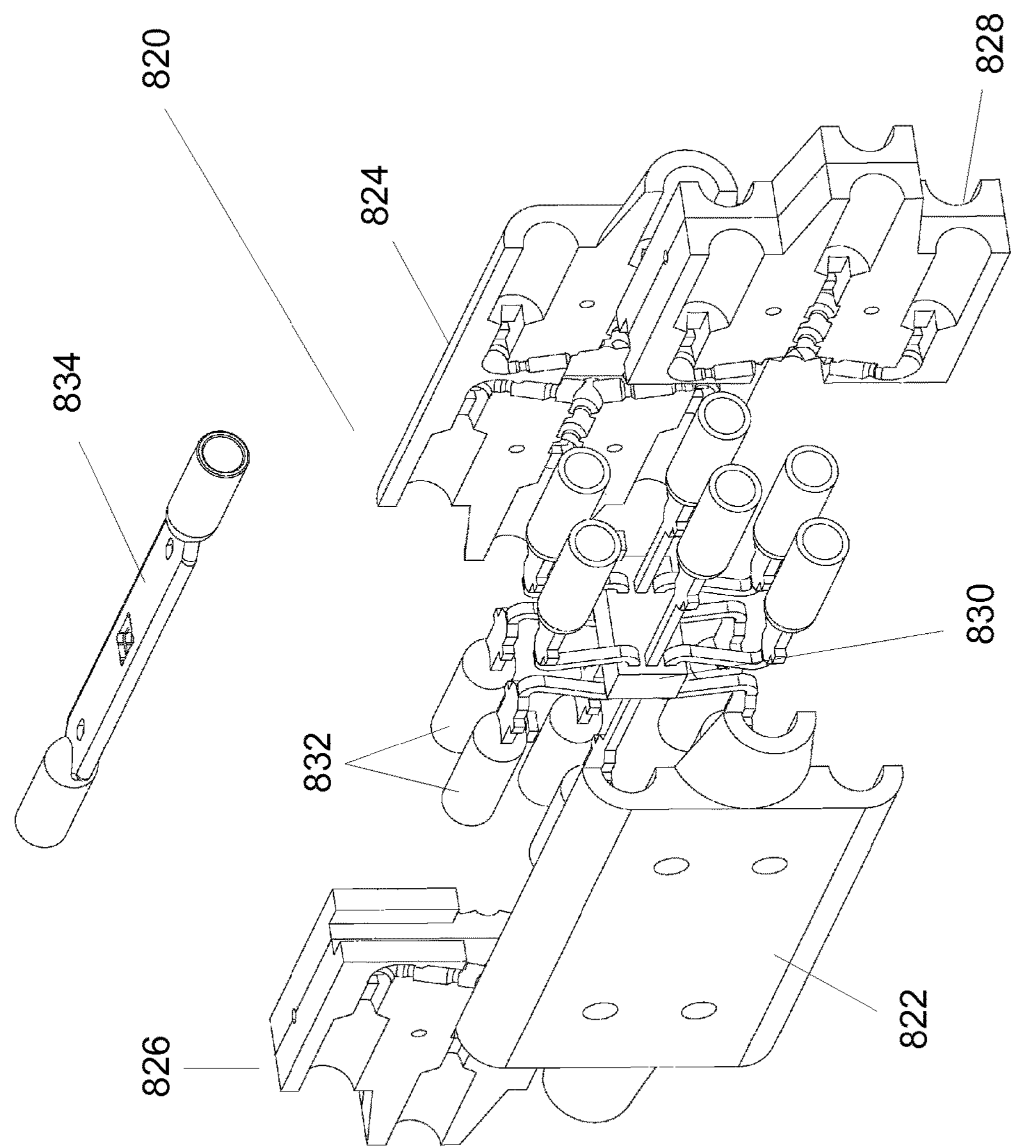

FIG. 8A and FIG. 8B are designed to visually depict the improvement over the existing art by providing a cut-away view of the various components utilized to construct an existing crab joint (FIG. 8A) and the low-profile crab joint (FIG. 8B) claimed in the present invention. The insulating housing of the existing crab joint 800 (FIG. 8A) is comprised of a top portion 802, bottom portion 804, left portion 806 composed of two units, and a right portion 808 composed of two units. Each of the aforementioned components of the insulating housing is designed to secure the junction plate 810 therewithin in the intermediate assembly of the constructed insulation housing. As previously mentioned, the junction plate 810 is made from a highly conductive material, such as pure copper, and plated with a material such as tin to resist corrosion, and is designed to serve as a conduction and connection point for the plurality of standard legs 812. In addition, the ring bus leg 814 is electronically connected to the junction plate 810 at a position central to the standard leg assembly. While the improved crab joint 820 of the present invention, as depicted in FIG. 8B, accomplishes the same objectives of the known crab joint 800 depicted in FIG. 8B, the improvements in the positioning of the legs and construction of the insulated housing results in a design which is clearly more compact and utilizes less material in its construction than known designs. Comparing FIG. 8A and FIG. 8B, which are presented roughly to scale to each other, one of ordinary skill in the art will readily recognize that by removing the bus leg 834 from the central portion of the junction plate 830 (and making other modifications as disclosed in more detail herein), an improved design is achieved which departs significantly from designs known in the art. Like the known crab joint 800 depicted in FIG. 8A, the low profile crab joint 820 of the present invention as depicted in FIG. 8B includes an insulating housing comprised of a top portion 822, bottom portion 824, left portion 826, and a right portion 828. While the prior art crab joint must utilize two units to form the left portion and two units to form the right portion to allow for the legs to be secured therewithin, the design of the present invention accomplishes the same objective by utilizing a single unit for each portion (or in some instances a single unit fused from one or more units). This is a significant improvement over the existing art as it results in the use of less material for the manufacture and of course reduces the manufacturing requirements by limiting the number of portions which must be manufactured. Further, while each design depicted in FIG. 8A and FIG. 8B includes the same number of standard legs 812 (FIG. 8A), 832 (FIG. 8B), the connection elements of standard legs 832, are designed at an angle departing from vertical so as to allow for a more compact position of the outer legs. Such positioning of the connection elements further facilitates the compact design of the present invention.

Figure 9A:
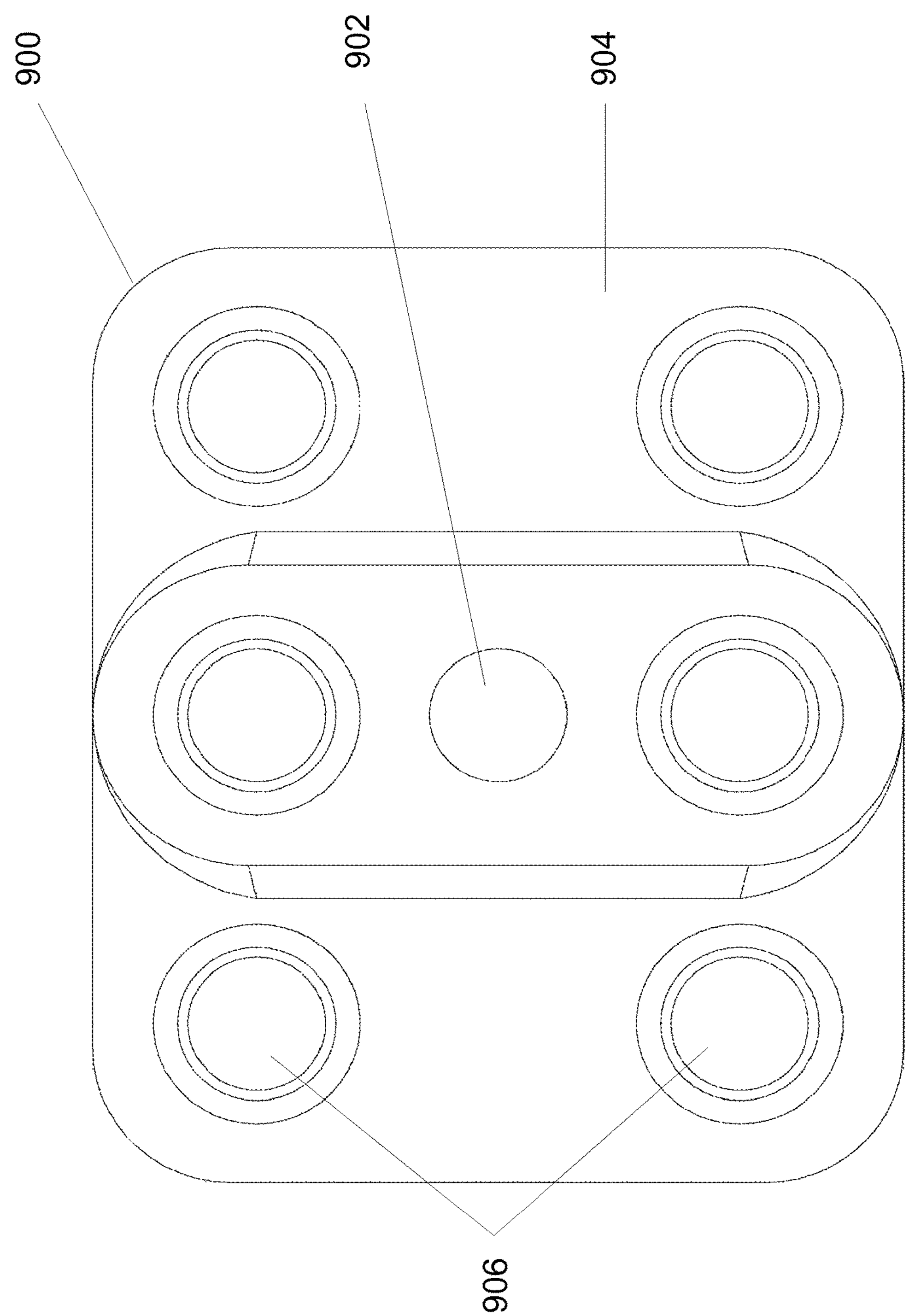
FIG. 9A and FIG. 9B are side views of an existing crab joint (FIG. 9A) and the low-profile crab joint (FIG. 8B) claimed in the present invention.
Figure 9B:
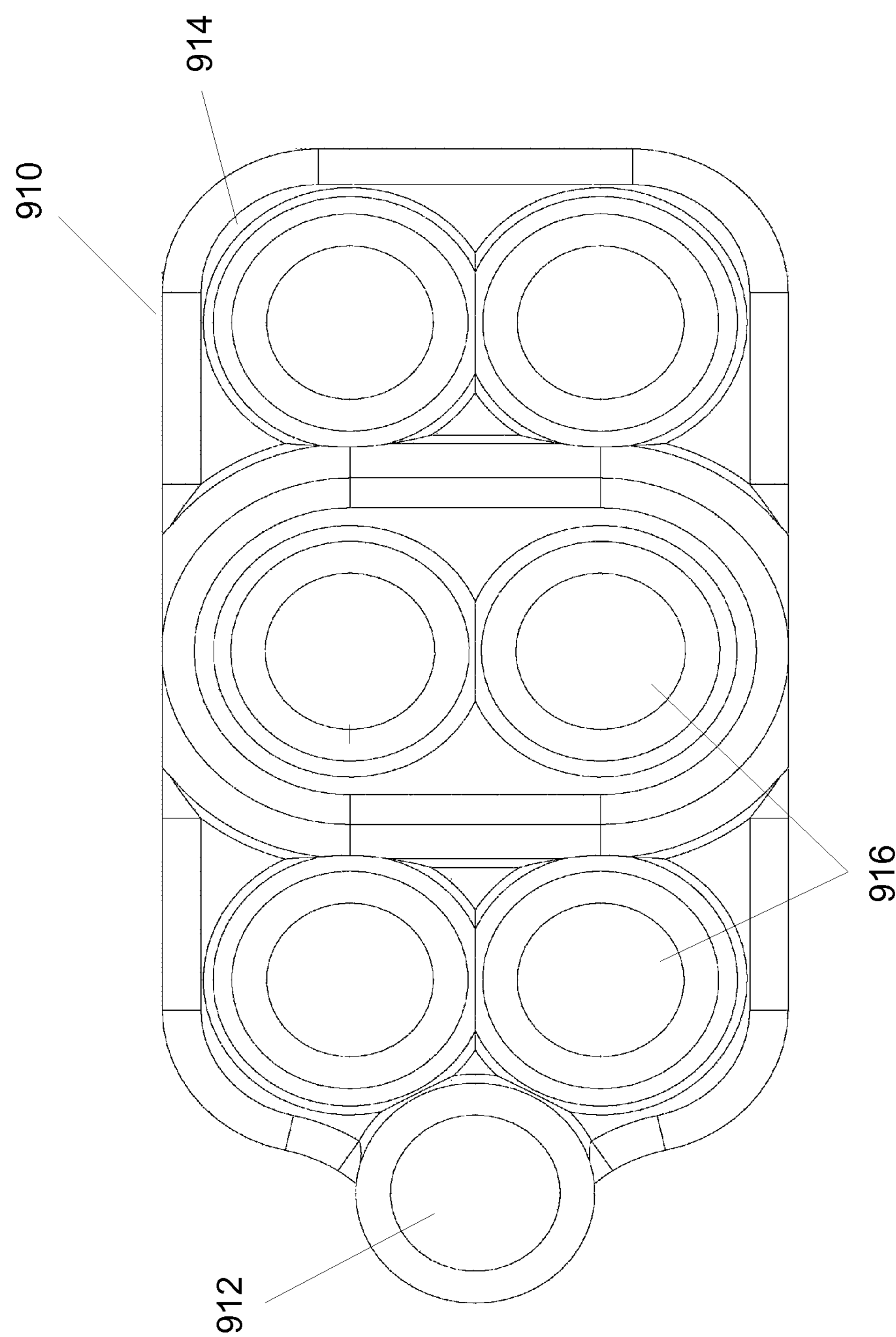

The improvements discussed in the present detailed description, including those addressed in the comparison of FIG. 8A in light of FIG. 8B, are further evident in FIG. 9A and FIG. 9B. By removing the ring bus leg 902 (FIG. 9A) from the central position to the position of ring bus leg 912 (FIG. 9B), the overall vertical dimension of known crab joint 900 is substantially reduced as evidenced in the crab joint 910 of the present invention. In one exemplary embodiment of the present invention, this repositioning of the ring bus legs (along with the other improvements disclosed herein with respect to the present design) results in over a thirty percent reduction in the overall dimension. Specifically, in one known exemplary embodiment, the overall vertical dimension of the crab joint is 5.875 inches, and in an exemplary embodiment of the improved design of the crab joint, the overall vertical dimension is less than 4.066 inches. It is also evident in the figures that such positioning of the ring bus leg 902 (FIG. 9A) at a central position in the known crab joint 900 to the positioning of the ring bus leg 912 (FIG. 9B) at an outer position in the improved crab joint also allows for the reduction of insulating material within the insulating housing 904 (FIG. 9A) as compared to the insulating housing 914 (FIG. 9B) and further allows for closer positioning of the standard legs 906 (FIG. 9A) of the known crab joint 900 and the standard legs 916 (FIG. 9B) of the improved crab joint 910 of the present invention.

Figures 10A, 10B:
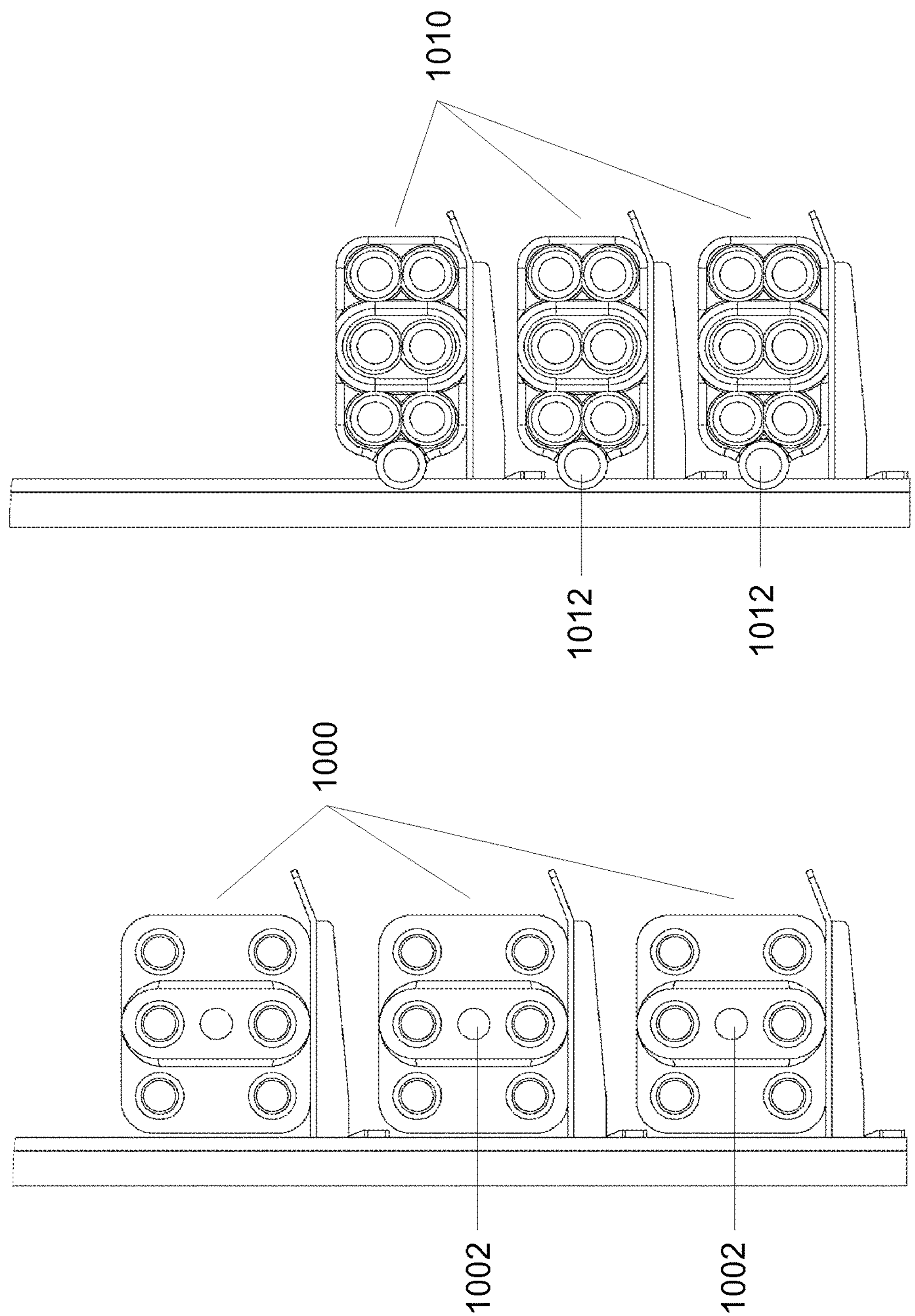
FIG. 10A and FIG. 10B are side views of an existing crab joint (FIG. 10A) and the low-profile crab joint (FIG. 10B) claimed in the present invention in a racked environment.

The compact nature and improvements of the present invention are most apparent in FIG. 10A as compared to FIG. 10B which depicts known crab joints 1000 (FIG. 10A) in a racked environment as compared to the improved crab joints 1010 (FIG. 10B) in a racked environment. Like several of the prior figures, FIG. 10A and FIG. 10B are show in relevant scale to each other. Substantial vertical height reduction is achieved, in one exemplary embodiment by approximately thirty percent, by repositioning the ring bus leg 1002 (FIG. 10A) of known crab joints 1000 (FIG. 10A) from a central position to the position of ring bus leg 1012 (FIG. 10B) of improved crab joints 1010 (FIG. 10B) to a rack-side position and making the other improvements as disclosed herein. One of ordinary skill in the art will readily recognize that such improvements, at least in this particular example, result in the ability to include a fourth crab joint in the space previously occupied by only three crab joints.

Thus, there has been summarized and outlined, generally in broad form, a plurality of the most important features of the present invention. While this summary is presented so that the novelty of the present contribution to the related art may be better appreciated, it will further be apparent that additional features of the invention described hereinafter (which will form the subject matter of the claims appended hereto) will further define the scope, novelty, and in certain instances the improvements upon any existing art. The following description provides specific details for a thorough understanding of, and enabling description for, various examples of the technology. One skilled in the art will understand that the technology may be practiced without many of these details and it is to be readily understood that the invention presented herein is not limited in its application to the details of construction, namely the seven leg configuration, and to the arrangements of the components set forth in the foregoing description or illustrated in the various figures integrated and categorized herein. For example, in some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section. Those skilled in the art will appreciate that the disclosure of the present invention may readily be utilized as a basis for the designing of other similar structures, methods and systems for carrying out the various purposes and objectives of the present invention. Thus, the claims as set forth shall allow for such equivalent constructions insofar as they do not depart from the spirit and scope of the present invention as described herein.

We claim:

1. A method of establishing an electrical connection comprising the steps of:

connecting a plurality of cable mains in a rectangular configuration to a cable joint assembly; and connecting a bus connection to a non-limitered bus connector of the cable joint assembly at a location substantially adjacent to and substantially external of the rectangular configuration and at a location substantially along a centerline of the rectangular configuration.

2. The method of establishing an electrical connection of claim 1, wherein the plurality of cable mains and the bus connection are connected to the cable joint assembly via a compression connection.

* * * * *